US010432517B2

(12) United States Patent
Hallivuori et al.

(10) Patent No.: US 10,432,517 B2
(45) Date of Patent: Oct. 1, 2019

(54) NETWORK ELEMENT OF A SOFTWARE-DEFINED NETWORK

(71) Applicant: CORIANT OY, Espoo (FI)

(72) Inventors: Ville Hallivuori, Espoo (FI); Juhamatti Kuusisaari, Helsinki (FI)

(73) Assignee: Coriant Oy, Espoo (FI)

( * ) Notice: Subject to any disclaimer, the term of this patent is extended or adjusted under 35 U.S.C. 154(b) by 90 days.

(21) Appl. No.: 15/537,176

(22) PCT Filed: Dec. 15, 2015

(86) PCT No.: PCT/FI2015/050882
§ 371 (c)(1),
(2) Date: Jun. 16, 2017

(87) PCT Pub. No.: WO2016/097480
PCT Pub. Date: Jun. 23, 2016

(65) Prior Publication Data
US 2018/0013667 A1    Jan. 11, 2018

(30) Foreign Application Priority Data

Dec. 19, 2014  (FI) .................................... 20146123

(51) Int. Cl.
H04L 12/741   (2013.01)
H04L 12/715   (2013.01)
H04L 12/931   (2013.01)

(52) U.S. Cl.
CPC .............. H04L 45/54 (2013.01); H04L 45/64 (2013.01); H04L 49/70 (2013.01)

(58) Field of Classification Search
None
See application file for complete search history.

(56) References Cited

U.S. PATENT DOCUMENTS

2014/0112150 A1    4/2014  Ko et al.
2014/0177634 A1*   6/2014  Jiang ...................... H04L 45/64
                                                          370/392
2014/0241349 A1*   8/2014  Yoon ....................... H04L 47/10
                                                          370/389

FOREIGN PATENT DOCUMENTS

EP    2 824 877 A1     1/2014
WO    2013/133227 A1   9/2013
WO    2014/166551 A1   10/2014

OTHER PUBLICATIONS

OpenFlow Switch Specification, Version 1.4.0, ONF TS-012, Oct. 14, 2013 (Oct. 14, 2013), pp. 1-206, XP055235997, Retrieved from the Internet <URL:https://www.opennetworking.org/images/stories/downloads/sdn-resources/onf-specifications/openflow/openflow-spec-v1.4.0.pdf> [retrieved on Dec. 14, 2015].

(Continued)

Primary Examiner — Kevin C. Harper
Assistant Examiner — Derrick V Rose
(74) Attorney, Agent, or Firm — Young & Thompson

(57) ABSTRACT

A network element of a software-defined network includes a processing system for maintaining a control system for managing data. The control system is maintained in accordance with configuration data received from a controller of the software-defined network. In a case where the control system has no entry corresponding to frame information related to a received data frame, the processing system checks whether status information indicates availability of the frame information to the controller. If the status information does not indicate the availability, the processor system arranges the frame information to be available to the controller and updates the status information to indicate the availability. Thus, data traffic related to data-driven learning and occurring between the network element and the con- (Continued)

troller can be reduced with the aid of the above-mentioned status information.

24 Claims, 3 Drawing Sheets

(56) References Cited

OTHER PUBLICATIONS

Seungwon Shin et al.: "AVANT-GUARD: Scalable and vigilant Switch Flow Management in Software-Defined Networks", CCS'13 Proceedings of the 2013 ACM SIGSAC conference on Computer & communications security, pp. 413-424, Jan. 4, 2013, ACM New York, NY, USA 2013.

FI Search Report, dated Jun. 26, 2015, from corresponding FI20146123 application.

International Search Report, dated Apr. 1, 2016, from corresponding PCT/FI2015/050882 application.

\* cited by examiner

NETWORK ELEMENT OF A SOFTWARE-DEFINED NETWORK

FIELD OF THE DISCLOSURE

The disclosure relates generally to software-defined networking. More particularly, the disclosure relates to a network element for a software-defined network "SDN". Furthermore, the disclosure relates to a method for managing data traffic related to data driven-learning and occurring between a network element and a controller in a software-defined network. Furthermore, the disclosure relates to a computer program for managing data traffic related to data driven-learning and occurring between a network element and a controller in a software-defined network.

BACKGROUND

Software-defined networking is an emerging architecture for data transfer networks. In a software-defined network "SDN", the control plane is separated from the data plane so that the control-plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

The one or more controllers of the software-defined network "SDN" are adapted to configure the network elements so that the network elements are capable of operating as nodes of the software-defined network. When configuring a network element, the controller sends to the network element configuration data with the aid of which the network element constructs a control system for forwarding and otherwise managing data. The control system comprises typically one or more look-up tables with the aid of which the network element is capable of operating as a part of the software-defined network. The control system can be constructed and maintained in accordance with for example the OpenFlow protocol. Details about the Open Flow can be found from the Open Flow Switch Specification managed by the Open Networking Foundation "ONF".

In data driven learning, a network element, e.g. a router, of a software-defined network needs to provide the controller with information related to a data frame when certain criteria are met. In this document, the above-mentioned information enabling the data driven learning is hereinafter called frame information. The frame information can be provided to the controller e.g. so that a copy of the data frame, a part of the data frame, or the data frame itself is transferred to the controller. One example of the data driven learning is media access control "MAC" learning where appropriate frame information about a data frame that does not have a corresponding entry in a MAC-forwarding table or that arrives at an unexpected ingress port is steered to the controller, and the controller configures the source MAC-table and the destination MAC-table of the network element accordingly. The data driven learning may also occur in the Internet Protocol "IP" multicast when transitioning from the every source for a particular group "*, Group"-tree based multicasting to the source based distribution "Source, Group"-tree based multicasting.

The above-described data driven learning where frame information concerning data frames is delivered to a controller and the controller configures the control system, e.g. forwarding tables, of a network element at least partly on the basis of the above-mentioned information is however not free from challenges. One of the challenges is related to data traffic between the network element and the controller. In some cases it is possible that the same frame information is transferred hundreds or thousands of times from the network element to the controller before relevant entries of the control system of the network element are configured and the network element becomes capable of managing appropriate data frames without the aid of the controller. Thus, during data driven learning, there can be so much data traffic between the network elements and the controller that the data transfer capacity between the controller and the network elements may constitute a severe bottleneck from the viewpoint of the operation of the whole software-defined network.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new network element for a software-defined network "SDN". The network element can be, for example, an Internet Protocol "IP" router, a multiprotocol label switching "MPLS" switch, a packet optical switch, and/or an Ethernet switch. A network element according to the invention comprises a data transfer interface for receiving and transmitting data and a processing system adapted to:

maintain, in accordance with configuration data received from a controller of the software-defined network, a control system for managing data, check, in response to a situation in which the control system has no entry corresponding to frame information related to a received data frame, whether status information contains an indication that the frame information is available to the controller, and in response to a situation in which the status information lacks the indication, update the status information to contain the indication and arrange the frame information to be available to the controller so as to enable the controller to produce updated configuration data in accordance with the frame information.

The above-mentioned frame information comprises a source address of the received data frame and an identifier of an ingress interface at which the data frame was received at the network element.

Data traffic related to data driven learning and occurring between the network element and the controller can be reduced because unnecessary data transfers from the network element to the controller can be avoided or at least the amount of unnecessary data transfers can be reduced with the aid of the above-mentioned status information. Therefore, the present invention eliminates or at least alleviates the technical problem related to data traffic load from network elements, e.g. routers, to a controller of a software-defined network when the network elements are being configured based on data driven learning.

In accordance with the invention, there is provided also a new method for managing data traffic related to data driven-learning and occurring between a network element and a controller in a software-defined network. A method according to the invention comprises:

- checking, in response to a situation in which the control system of the network element has no entry corresponding to the frame information related to a received data frame, whether status information contains an indication that the frame information is available to the controller, and
- in response to a situation in which the status information lacks the indication, updating the status information to contain the indication and arranging the frame information to be available to the controller so as to enable the controller to produce updated configuration data in accordance with the frame information.

In accordance with the invention, there is provided also a new computer program for managing data traffic related to data driven-learning and occurring between a network element and a controller in a software-defined network. A computer program according to the invention comprises computer executable instructions for controlling a programmable processing system of the network element to:

- check, in response to a situation in which the control system of the network element has no entry corresponding to the frame information related to a received data frame, whether status information contains an indication that the frame information is available to the controller, and
- in response to a situation in which the status information lacks the indication, update the status information to contain the indication and arrange the frame information to be available to the controller so as to enable the controller to produce updated configuration data in accordance with the frame information.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

Figure 1:
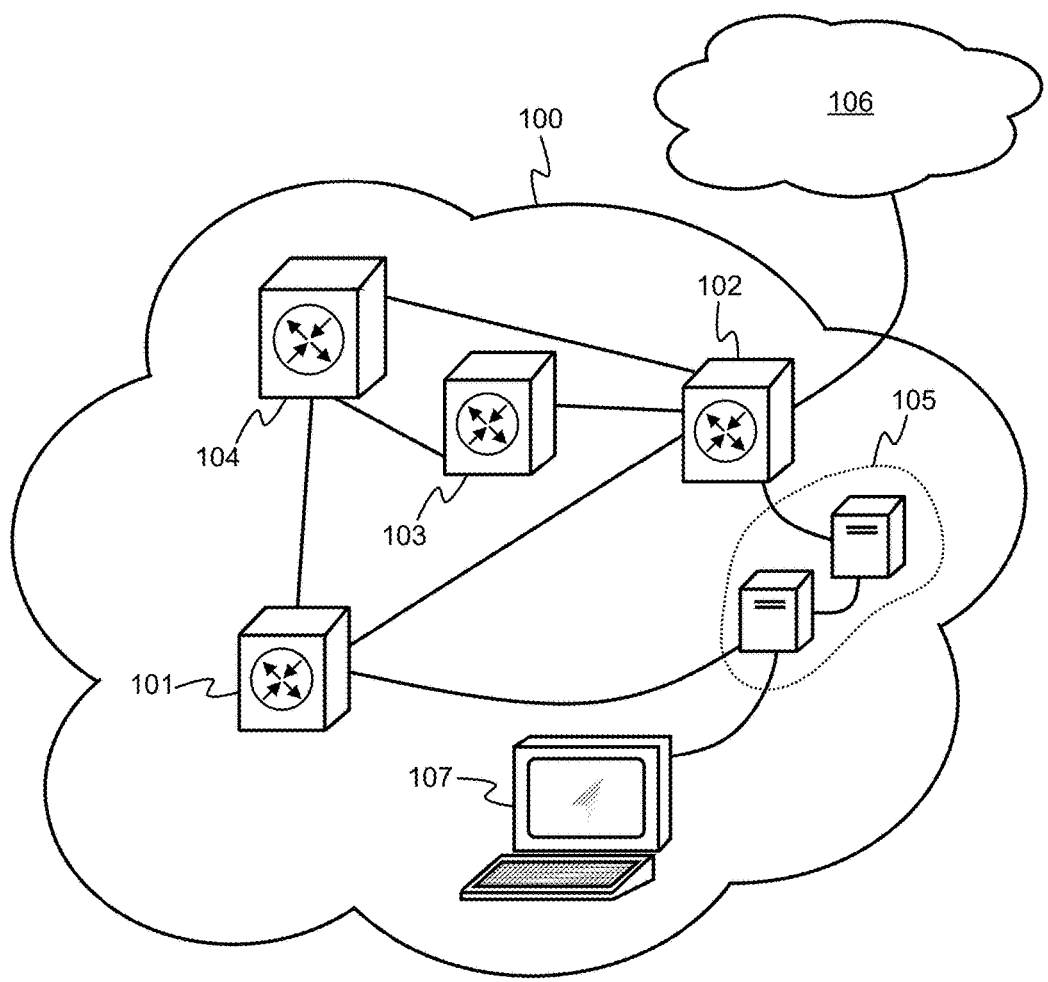
FIG. 1 shows a schematic illustration of a software-defined network comprising network elements according to an exemplifying and non-limiting embodiment of the invention.

FIG. 1 shows a schematic illustration of an exemplifying software-defined network "SDN" 100. The software-defined network comprises network elements 101, 102, 103, and 104 and a controller 105. The network elements 101-104 of this exemplifying software-defined network are mutually interconnected with data transfer links as illustrated in FIG. 1. Furthermore, the exemplifying software-defined network "SDN" 100 may comprise other network elements that are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, the controller 105 may consist of a single apparatus or a combination of a plurality of apparatuses. In the exemplifying case illustrated in FIG. 1, the controller 105 comprises two interconnected apparatuses. A user interface device 107 is connected to the controller 105 and the network element 102 acts as a gateway to an external network 106 that can be e.g. the global Internet. The controller 105 comprises a data transfer interface for receiving data from the terminal device 107 and/or from one or more other devices connected with data transfer links to the data transfer interface of the controller. It is to be noted that the controller 105, or one or more parts of it, can also act as one or more network elements that can be e.g. an Internet Protocol "IP" router, a multiprotocol label switching "MPLS" switch, a packet optical switch, and/or an Ethernet switch.

The controller 105 is adapted to send configuration data to at least one of the network elements 101-104 so as to enable each network element under consideration to construct and maintain a control system that enables the network element to manage data frames in a desired manner. The control system comprises typically a system of interconnected look-up tables for selecting software-defined actions to be carried out in different operational situations. The data frames to be managed can be for example Internet Protocol IP-packets, MPLS-labeled frames, Ethernet frames, or protocol data units "PDU" according to some other data transfer protocol. The controller 105 can be adapted to configure the network element under consideration in accordance with e.g. the OpenFlow or some other protocol suitable for the software-defined networking.

In an exemplifying case where the OpenFlow is used, the control system of a network element comprises one or more flow tables and one or more group tables according to the OpenFlow specification. Each flow table contains a set of flow entries. Each flow entry may consist of match fields, counters, and a set of software-defined actions to apply to matching data frames. Matching typically starts at the first flow table and may continue to additional flow tables. Flow entries are typically arranged into a priority order and the first matching entry in each table is the one being used. If a matching flow entry is found, the one or more software-defined actions associated with this specific flow entry are executed. If no match is found in a flow table, the data frame under consideration may be forwarded to the controller 105 over an OpenFlow channel between the network element under consideration and the controller 105, the data frame may be dropped, or the data frame may continue to the next flow table or to a group table. Software-defined actions associated with each flow entry may comprise for example data frame forwarding, data frame modification, group table processing, and pipeline processing.

Pipeline processing actions allow data frames to be sent to subsequent flow tables for further processing and allow information, in the form of metadata, to be communicated between the flow tables. In conjunction with the OpenFlow, the metadata is typically a bit vector having 64 bits. The pipeline processing stops when the one or more software-defined actions associated with a matching flow entry does not specify a next table. At this point the data frame under consideration is usually modified and forwarded. The group table processing actions allow data frames to be sent to a group table for further processing and allow information, in the form of metadata, to be communicated to the group table. The group table contains group entries, where each group entry may contain a list of software-defined actions to be executed in conjunction with data frames defined to belong to a particular group. Furthermore, the configuration data that is sent to one or more of the network elements 101-104 may comprise one or more configuration programs each of which comprising one or more computer executable instructions defining a software-defined action or a chain of software-defined actions to be executed in conjunction with managing data in the network element under consideration. The software-defined action or the chain of software-defined actions defined by the configuration program may comprise for example: recording data into a memory, modifying the data, selecting one or more of egress ports of the network element and forwarding the data and its possible duplicates to the selected one or more egress ports, selecting one or more look-up tables of a configuration system of the network element and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data.

In the exemplifying software-defined network illustrated in FIG. 1, at least one of the network elements 101-104 is at least partly configured with data driven learning. Without limiting the generality and merely for illustrative purposes, was can assume that the network element 101 is at least partly configured with data driven learning. The network element 101 comprises a data transfer interface for receiving and transmitting data. The network element 101 comprises means for constructing and maintaining a control system in accordance with configuration data received from the controller 105. The control system enables the network element 101 to forward and otherwise manage received data frames so that the network element is capable of operating as a part of the software-defined network 100. The network element 101 comprises means for maintaining status information with the aid of which the network element can manage the data traffic related to the data driven learning and occurring between the network element 101 and the controller 105. In a case where the control system of the network element 101 has no entry corresponding to frame information, e.g. a Media Access Control "MAC" source address and an ingress port identifier, related to a received data frame, the network element 101 checks whether the status information contains an indication that the above-mentioned frame information has already been made available to the controller 105. If the status information contains the above-mentioned indication, there is no need to make the frame information available to the controller 105 again. If the status information does not contain the indication that the above-mentioned frame information has already been made available to the controller 105, the network element 101 updates the status information to contain the indication and arranges the frame information to be available to the controller 105 so as to enable the controller to produce updated configuration data in accordance with the frame information.

The above-mentioned frame information can be made available to the controller 105 for example so that the network element 101 transmits to the controller 105 a data frame containing the frame information. This data frame can be e.g. the above-mentioned received data frame, or a copy of it, modified so that the data frame delivered to the controller is arranged to contain such a portion of the frame information which is not contained by the received data frame, e.g. an ingress port identifier in a case of the MAC-learning. It is also possible that the frame information is made available to the controller 105 for example so that the network element 101 writes the frame information to a status table readable by the controller and the network element 101 sends to the controller 105 a notification expressing that there is new data in the status table. In this exemplifying case, the status table can be used also as the above-mentioned status information which expresses whether certain frame information has already been made available to the controller. In practice, the status table can be readable by the controller 105 so that the controller sends a request message to the network element and the network element 101 responds to the request message by sending to the controller one or more data frames which contain the contents of the status table.

An advantage of the above-described approach based on the status table is that the contents of the status table can be amended in a case where the controller 105 has not yet read the status table. For example, there can be a situation where certain frame information, e.g. a source MAC-address and an ingress port identifier, has been written to the status table after the network element has received a first data frame and thereafter the network element receives, at another ingress port, a second data frame having the same source MAC-address. In this case, if the controller 105 has not yet read the status table, it is possible to amend the frame information so that the original ingress port identifier is replaced with an identifier of the other ingress port.

Figure 2:
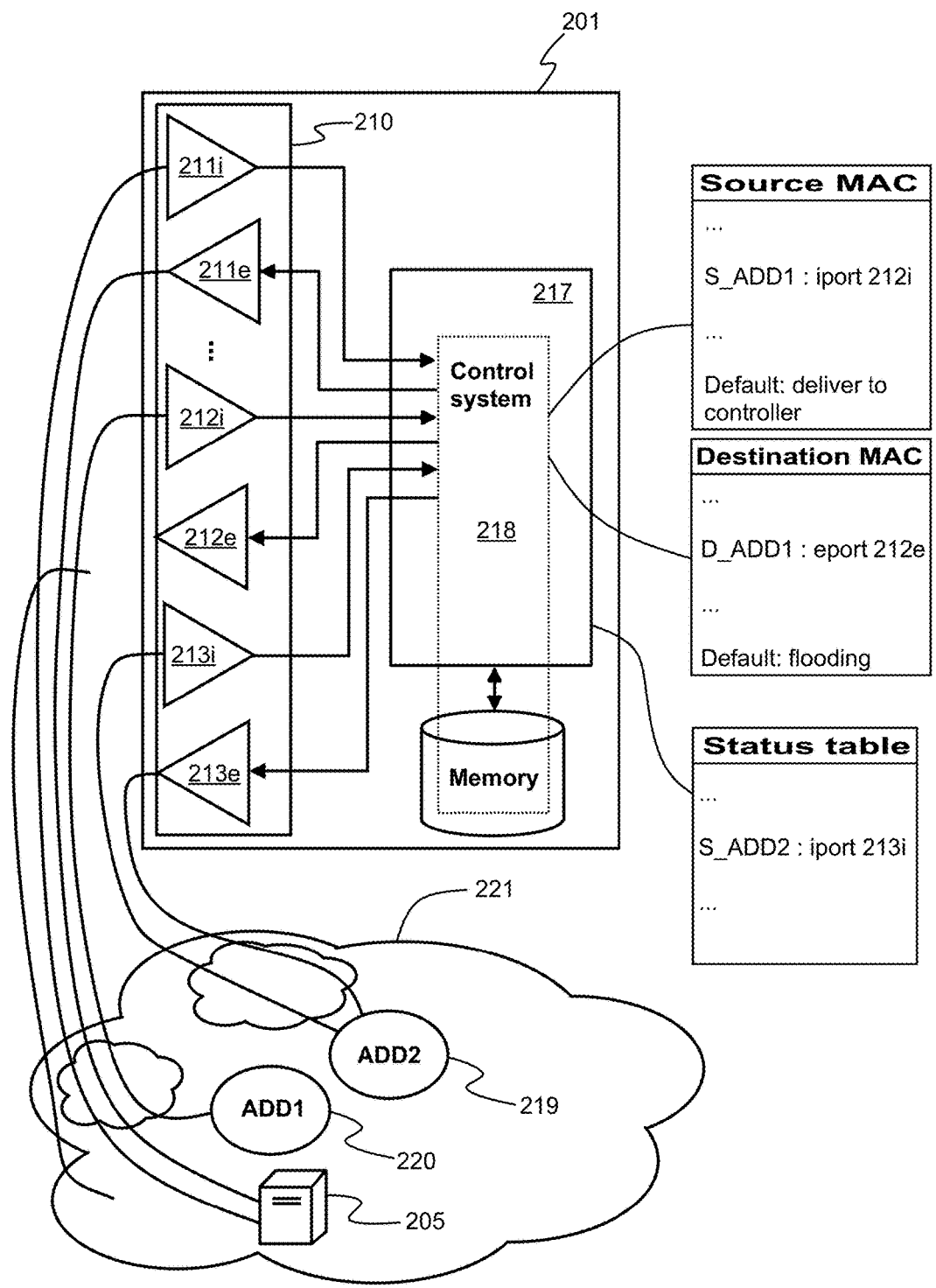
FIG. 2 shows a schematic illustration of a network element according to an exemplifying and non-limiting embodiment of the invention.

FIG. 2 shows a schematic illustration of a network element 201 according to an exemplifying and non-limiting embodiment of the invention. The network element can be, for example, an Internet Protocol "IP" router, a Multiprotocol label switching "MPLS" switch, a packet optical switch, and/or an Ethernet switch. The network element comprises a data transfer interface 210 for receiving data and for transmitting data. The data transfer interface 210 comprises ingress ports and egress ports for connecting via data transfer links to a data transfer network 221. In FIG. 2, three of the ingress ports are denoted with reference numbers 211*i*, 212*i*, and 212*i*, and three of the egress ports are denoted with reference numbers 211*e*, 212*e*, and 213*e*.

The network element 201 comprises a processing system 217 for constructing and maintaining a control system 218 for managing data received at the network element 201. The control system is constructed and maintained in accordance with configuration data received from a controller 205. The control system 218 enables the network element 201 to forward and otherwise manage received data frames so that the network element is capable of co-operating with the data transfer network 221. The processing system 217 is adapted to maintain status information with the aid of which the network element 201 can manage the data traffic related to data driven learning and occurring between the network element 201 and the controller 205. In a case where the control system 218 has no entry corresponding to frame information related to a received data frame, the processing system 217 checks whether the status information contains an indication that the above-mentioned frame information has already been made available to the controller 205. If the status information contains the above-mentioned indication, there is no need to make the frame information available to the controller 205 again. If the status information does not contain the indication that the above-mentioned frame information has already been made available to the controller 205, the processing system 217 updates the status information to contain the indication and arranges the frame information to be available to the controller 205 so as to enable the controller to produce updated configuration data in accordance with the frame information.

The above-mentioned frame information may comprise for example a source address of the received data frame and an identifier of an ingress interface at which the data frame was received. The source address can be for example a Media Access Control "MAC" source address and the identifier of the ingress interface can be an identifier of an ingress port at which the data frame was received. For another example, the frame information may comprise an Internet Protocol "IP" source address of the received data frame, an IP multicast-group address of the received data frame, and an identifier of a logical ingress interface at which the data frame was received.

In a network element according to an exemplifying and non-limiting embodiment of the invention, the processing system 217 is adapted to erase the above-mentioned indication from the status information in response to a situation in which the network element 201 has received the updated configuration data from the controller 205 and the processing system 217 has updated the control system 218 in accordance with the updated configuration data.

In a network element according to an exemplifying and non-limiting embodiment of the invention, the processing system 217 is adapted to erase the above-mentioned indication from the status information in response to a situation in which a predetermined time has elapsed after the update of the status information to contain the indication. In this case, it cannot be guaranteed that the frame information is delivered to the controller 205 only once, but the data traffic related to the data driven learning and occurring between the network element 201 and the controller 205 can however be reduced with the aid of the above-mentioned status information.

In a network element according to an exemplifying and non-limiting embodiment of the invention, the processing system 217 is adapted to erase the above-mentioned indication from the status information in response to a situation in which a predetermined number of other indications have been included in the status information after the inclusion of the indication under consideration. Also in this case, it cannot be guaranteed that the frame information is delivered to the controller 205 only once, but the data traffic related to the data driven learning can be however reduced.

In a network element according to an exemplifying and non-limiting embodiment of the invention, the processing system 217 is adapted to control the network element 201 to transmit the above-mentioned frame information to the controller 205 when there is a need to arrange the frame information to be available to the controller.

In a network element according to an exemplifying and non-limiting embodiment of the invention, the processing system 217 is adapted to write the frame information to a status table readable by the controller 205 when there is a need to arrange the frame information to be available to the controller. The processing system 217 can be adapted to send a NEW DATA notification to the controller when new frame information is written to the status table. More advantageously, in order to avoid unnecessary bursts of NEW DATA notifications when different instances of frame information are written to the status table within a short time period, the processing system 217 is adapted to send the NEW DATA notification to the controller only when the writing the frame information to the status table changes the status table from a first state in which the status table is free from data unread by the controller and needed to be read by the controller to a second state in which the status table contains data unread by the controller and needed to be read by the controller. It is also possible that the processing system 217 is adapted to send the NEW DATA notification to the controller when a predetermined amount of data has been written to the status table after a previously sent NEW DATA notification or a predetermined time has elapsed after the latest writing to the status table. The processing system 217 can be adapted to send to the controller 205 an ALL READ notification when all the data of the status table has been read by the controller. Thus, the controller 205 can be adapted to read the status table after the controller has received the above-mentioned NEW DATA notification as long as the controller receives the ALL READ notification. In order to avoid unnecessary bursts of NEW DATA notifications when different instances of frame information are written to the status table within a short time period, the processing system 217 can be adapted to send to the controller 205 the NEW DATA notification only when the frame information is written to the status table first time after the ALL READ notification has been sent to the controller.

FIG. 2 presents an exemplifying situation where the egress port 212*e* provides access to an entity 220 having a MAC-address ADD1 and data frames sent by the entity 220 to the network element 201 arrive at the ingress port 212*i*. The entity 220 can be for example a network element such as e.g. an IP-router. Correspondingly, the egress port 213*e* provides access to an entity 219 having a MAC-address ADD2 and data frames sent by the entity 219 to the network element 201 arrive at the ingress port 213*i*. The egress port 211*e* provides access to the controller 205 and data frames sent by the controller 205 to the network element 201 arrive at the ingress port 211*i*. The Source MAC table and the Destination MAC table shown in FIG. 2 correspond to a situation where a first data frame having the source MAC-address ADD1 has been received at the ingress port 212*i*. Thereafter, frame information comprising the source MAC-address ADD1 and an identifier of the ingress port 212*i* has been made available to the controller 205, the controller has produced configuration data taking into account the above-mentioned frame information, and the network element 201 has received the configuration data and updated the Source MAC table and the Destination MAC table in accordance with the configuration data. For the sake of illustration, we assume that the network element 201 receives at the ingress port 213*i* a second data frame having the source MAC-address ADD2. In this exemplifying situation, the Source MAC table does not have an entry that would correspond to the ingress port 213*i* and the source MAC-address ADD2. Correspondingly, the Destination MAC table does not have an entry that would correspond to the egress port 213*e* and the destination MAC-address ADD2. Thus, in this case, the frame information comprising the source MAC-address ADD2 and an identifier of the ingress port 213*i* is made available to the controller 205. In this exemplifying case, the frame information is made available to the controller 205 so that the frame information is written to the Status table shown in FIG. 2.

In a network element according to an exemplifying and non-limiting embodiment of the invention, the processing system 217 is adapted to change a part of the frame information written to the status table in response to a situation in which the controller 205 has not yet read the frame information from the status table and a third data frame received at the network element 201 after writing the frame information to the status table indicates that the part of the frame information is to be changed. For example, the routing configuration of the data transfer network 221 may change so that data frames sent by the entity 219 to the network element 201 are received at the ingress port 212*i* instead of the ingress port 213*i*. In this case, the frame information "S_ADD2: iport 213*i*" can be corrected to be "S_ADD2: iport 212*i*" if the controller 205 has not yet read the status table. If the controller has read the status table, the frame information "S_ADD2: iport 212*i*" is written to the status table and the controller can recognize the changed situation when the controller next time reads the status table.

In a network element according to an exemplifying and non-limiting embodiment of the invention, the above-mentioned status table is used as the above-mentioned status information which expresses whether the frame information has already been made available to the controller and the processing system 217 is adapted to erase the frame information from the status table in response to one of the following a situations: a) the controller has read the frame information from the status table, b) a pre-determined time has elapsed after the writing the frame information to the status table, or c) a predetermined amount of data has been written to the status table after the writing the frame information to the status table. In the above-mentioned exemplifying cases, it cannot be guaranteed that the frame information is delivered to the controller 205 only once, but the data traffic related to the data driven learning can be however reduced. In order to guarantee that the frame information is delivered to the controller 205 only once, the frame information should to be maintained in the status table as long as the control system of the network element has been updated to contain an entry corresponding to the frame information under consideration. Erasing the frame information from the status table in accordance with the update of the control system however complicates the network element, and therefore the above mentioned less optimal approaches for erasing the frame information are often preferable.

The processing system 217 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
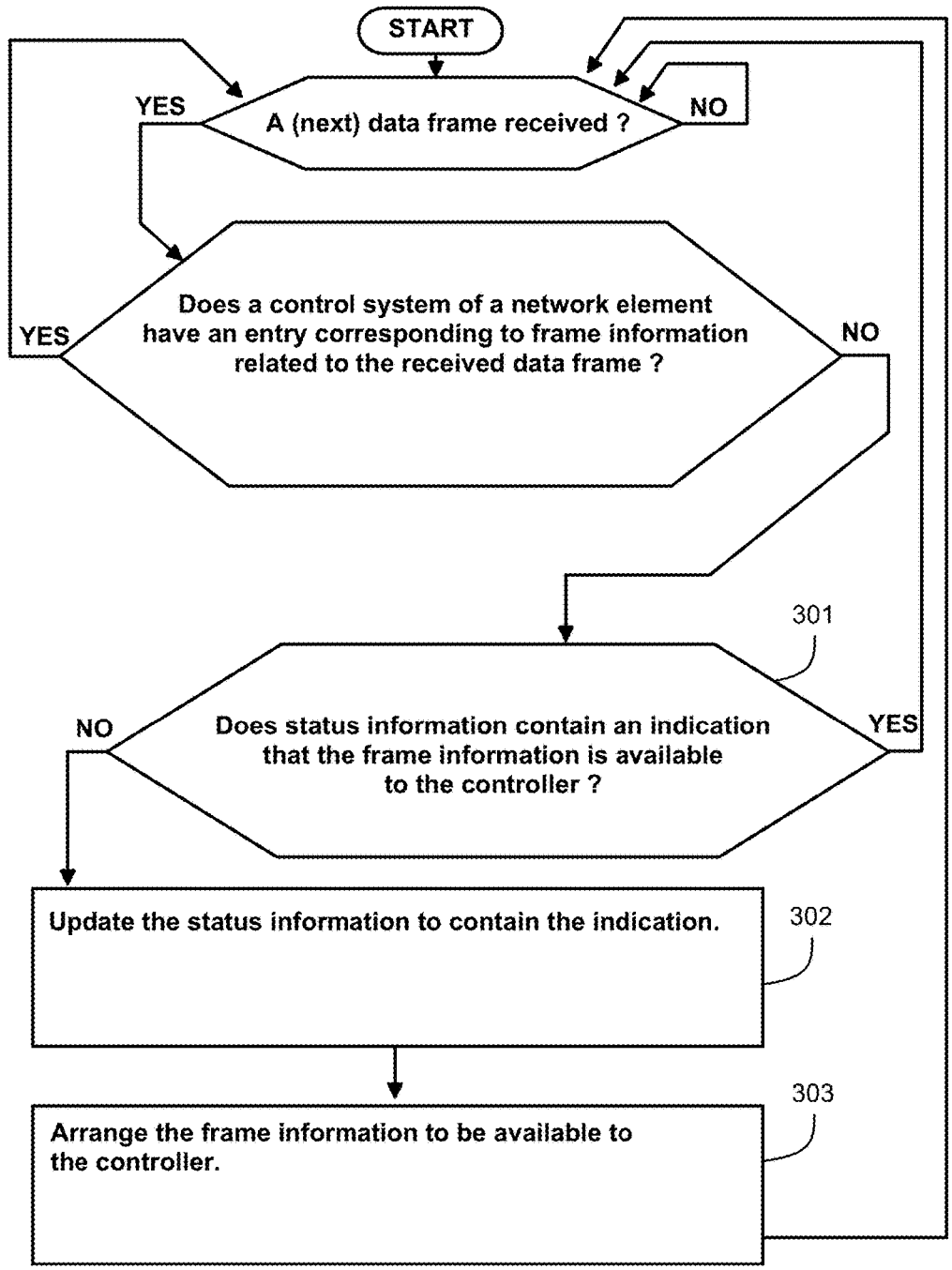
FIG. 3 shows a flowchart of a method according to an exemplifying and non-limiting embodiment of the invention for managing data traffic related to data driven-learning and occurring between a network element and a controller in a software-defined network.

FIG. 3 shows a flowchart of a method according to an exemplifying and non-limiting embodiment of the invention for managing data traffic related to data driven-learning and occurring between a network element and a controller in a software-defined network "SDN". The network element constructs and maintains, in accordance with configuration data received from the controller, a control system for managing data received at the network element. In a case where the control system does not have an entry corresponding to frame information enabling data driven learning and related to a data frame received at the network element, the method comprises checking 301 whether status information contains an indication that the frame information is available to the controller. In a case where the status information does not contain the above-mentioned indication, the method comprises updating 302 the status information to contain the indication and arranging 303 the frame information to be available to the controller so as to enable the controller to produce updated configuration data in accordance with the frame information. In the opposite case where the status information contains the indication, there is no need to make the frame information to be available to the controller.

A method according to an exemplifying and non-limiting embodiment of the invention comprises erasing the above-mentioned indication from the status information in response to a situation in which the network element has received the updated configuration data from the controller and the network element has updated the control system in accordance with the updated configuration data.

A method according to an exemplifying and non-limiting embodiment of the invention comprises erasing the above-mentioned indication from the status information in response to a situation in which a predetermined time has elapsed after the updating the status information to contain the indication.

A method according to an exemplifying and non-limiting embodiment of the invention comprises erasing the above-mentioned indication from the status information in response to a situation in which a pre-determined number of other indications have been included in the status information after the inclusion of the indication under consideration.

A method according to an exemplifying and non-limiting embodiment of the invention comprises transmitting the frame information from the network element to the controller so as to arrange the frame information to be available to the controller.

A method according to another exemplifying and non-limiting embodiment of the invention comprises writing the frame information to a status table readable by the controller so as to arrange the frame information to be available to the controller.

A method according to an exemplifying and non-limiting embodiment of the invention comprises sending a NEW DATA notification to the controller in response to the writing the frame information to the status table. More advantageously, in order to avoid unnecessary bursts of NEW DATA notifications when different instances of frame information are written to the status table within a short time period, the method comprises sending the NEW DATA notification to the controller only when the writing the frame information to the status table changes the status table from a first state in which the status table is free from data unread by the controller and needed to be read by the controller to a second state in which the status table contains data unread by the controller and needed to be read by the controller.

A method according to an exemplifying and non-limiting embodiment of the invention comprises sending a NEW DATA notification to the controller in response to a situation in which a predetermined amount of data has been written to the status table after a previously sent notification, and in response to a situation in which a predetermined time has elapsed after the latest writing to the status table.

A method according to an exemplifying and non-limiting embodiment of the invention comprises erasing the frame information from the status table in response to one of the following a situations: a) the controller has read the frame information from the status table, b) a pre-determined time has elapsed after the writing the frame information to the status table, c) a predetermined amount of data has been written to the status table after the writing the frame information to the status table.

A method according to an exemplifying and non-limiting embodiment of the invention comprises changing a part of the frame information written to the status table in response to a situation in which the controller has not yet read the frame information from the status table and another data frame received at the network element indicates that the part of the frame information is to be changed.

In a method according to an exemplifying and non-limiting embodiment of the invention, the frame information comprises a source address of the received data frame and an identifier of an ingress interface of the network element at which the data frame was received. The source address of the received data frame can be for example a Media Access Control "MAC" source address of the received data frame and the identifier of the ingress interface can be an identifier of an ingress port at which the data frame was received. For another example, the source address of the received data frame can be an Internet Protocol "IP" source address of the received data frame, the identifier of the ingress interface can be an identifier of a logical ingress interface at which the data frame was received, and the frame information may further comprise an IP multicast-group address of the received data frame.

A computer program according to an exemplifying and non-limiting embodiment of the invention comprises computer executable instructions for controlling a programmable processing system to carry out actions related to a method according to any of the above-described exemplifying and non-limiting embodiments of the invention.

A computer program according to an exemplifying and non-limiting embodiment of the invention comprises software modules for managing data traffic related to data driven-learning and occurring between a network element of a software-defined network and a controller of the software-defined network, the network element maintaining, in accordance with configuration data received from the controller, a control system for managing data received at the network element. The software modules comprise computer executable instructions for controlling a programmable processing system of the network element to:

check, in response to a situation in which the control system has no entry corresponding to frame information related to a data frame received at the network element, whether status information contains an indication that the frame information is available to the controller, and in response to a situation in which the status information lacks the indication, update the status information to contain the indication and arrange the frame information to be available to the controller so as to enable the controller to produce updated configuration data in accordance with the frame information.

The software modules can be e.g. subroutines or functions implemented with a suitable programming language and with a compiler suitable for the programming language and for the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. List and groups of examples provided in the description given above are not exhaustive unless otherwise explicitly stated.

What is claimed is:

1. A network element for a software-defined network, the network element comprising:
    a data transfer interface for receiving data and for transmitting data; and
    a processing system for maintaining, in accordance with configuration data received from a controller of the software-defined network, a control system for managing data,
    wherein the processing system is adapted to:
        check, in response to a situation in which the control system has no entry corresponding to frame information related to a data frame received at the network element, whether status information contains an indication that the frame information is available to the controller, and
        in response to a situation in which the status information lacks the indication, update the status information to contain the indication and arrange the frame information to be available to the controller so as to enable the controller to produce updated configuration data in accordance with the frame information, the status information being updated without waiting for the updated configuration data from the controller,
    wherein the frame information comprises a source address of the received data frame and an identifier of an ingress interface at which the data frame was received at the network element.

2. The network element according to claim 1, wherein the processing system is adapted to erase the indication from the status information in response to a situation in which the network element has received the updated configuration data from the controller and the processing system has updated the control system in accordance with the updated configuration data.

3. The network element according to claim 1, wherein the processing system is adapted to erase the indication from the status information in response to a situation in which a predetermined time has elapsed after the update of the status information to contain the indication.

4. The network element according to claim 1, wherein the processing system is adapted to write the frame information to a status table readable by the controller so as to arrange the frame information to be available to the controller.

5. The network element according to claim 4, wherein the processing system is adapted to control the network element to send a notification to the controller in response to a situation in which writing the frame information to the status table changes the status table from a first state in which the status table is free from data unread by the controller and needed to be read by the controller to a second state in which the status table contains data unread by the controller and needed to be read by the controller.

6. The network element according to claim 4, wherein the processing system is adapted to control the network element to send a notification to the controller in response to a situation in which a predetermined amount of data has been written to the status table after a previously sent notification, and in response to a situation in which a predetermined time has elapsed after a latest writing to the status table.

7. The network element according to claim 4, wherein the processing system is adapted to erase the frame information from the status table in response to one of the following situations: a) the controller has read the frame information from the status table, b) a pre-determined time has elapsed after writing the frame information to the status table, c) a predetermined amount of data has been written to the status table after the writing the frame information to the status table.

8. The network element according to claim 4, wherein the processing system is adapted to change a part of the frame information written to the status table in response to a situation in which the controller has not yet read the frame information from the status table and another data frame received at the network element after writing the frame information to the status table indicates that the part of the frame information is to be changed.

9. The network element according to claim 1, wherein the processing system is adapted to control the network element to transmit the frame information to the controller so as to arrange the frame information to be available to the controller.

10. The network element according to claim 1, wherein the processing system is adapted to set the frame information to comprise a Media Access Control source address of the received data frame and an identifier of an ingress port at which the data frame was received.

11. The network element according to claim 1, wherein the processing system is adapted to set the frame information to comprise an Internet Protocol source address of the received data frame, an Internet Protocol multicast-group address of the received data frame, and an identifier of a logical ingress interface at which the data frame was received.

12. The network element according to claim 1, wherein the network element is at least one of the following: an Internet Protocol IP router, a MultiProtocol Label Switching MPLS switch, a packet optical switch, an Ethernet switch.

13. A method for managing data traffic related to data driven-learning and occurring between a network element of a software-defined network and a controller of the software-defined network, the network element maintaining, in accordance with configuration data received from the controller, a control system for managing data received at the network element, the method comprising:
   checking, in response to a situation in which the control system has no entry corresponding to frame information related to a data frame received at the network element, whether status information contains an indication that the frame information is available to the controller; and
   updating, in response to a situation in which the status information lacks the indication, the status information to contain the indication and arranging (303) the frame information to be available to the controller so as to enable the controller to produce updated configuration data in accordance with the frame information, the status information being updated without waiting for the updated configuration data from the controller,
   wherein the frame information comprises a source address of the received data frame and an identifier of an ingress interface at which the data frame was received at the network element.

14. The method according to claim 13, wherein the method comprises erasing the indication from the status information in response to a situation in which the network element has received the updated configuration data from the controller and the network element has updated the control system in accordance with the updated configuration data.

15. The method according to claim 13, wherein the method comprises erasing the indication from the status information in response to a situation in which a predetermined time has elapsed after the updating the status information to contain the indication.

16. The method according to claim 13, wherein the method comprises writing the frame information to a status table readable by the controller so as to arrange the frame information to be available to the controller.

17. The method according to claim 16, wherein the method comprises sending a notification to the controller in response to a situation in which the writing the frame information to the status table changes the status table from a first state in which the status table is free from data unread by the controller and needed to be read by the controller to a second state in which the status table contains data unread by the controller and needed to be read by the controller.

18. The method according to claim 16, wherein the method comprises sending a notification to the controller in response to a situation in which a predetermined amount of data has been written to the status table after a previously sent notification, and in response to a situation in which a predetermined time has elapsed after a latest writing to the status table.

19. The method according to claim 16, wherein the method comprises erasing the frame information from the status table in response to one of the following situations: a) the controller has read the frame information from the status table, b) a pre-determined time has elapsed after the writing the frame information to the status table, c) a predetermined amount of data has been written to the status table after the writing the frame information to the status table.

20. The method according to claim 16, wherein the method comprises changing a part of the frame information written to the status table in response to a situation in which the controller has not yet read the frame information from the status table and another data frame received at the network element after the writing the frame information to the status table indicates that the part of the frame information is to be changed.

21. The method according to claim 13, wherein the method comprises transmitting the frame information from the network element to the controller so as to arrange the frame information to be available to the controller.

22. The method according to claim 13, wherein the source address of the received data frame is a Media Access Control source address of the received data frame and the identifier of the ingress interface is an identifier of an ingress port at which the data frame was received.

23. The method according to claim 13, wherein the source address of the received data frame is an Internet Protocol source address of the received data frame, the identifier of the ingress interface is an identifier of a logical ingress interface at which the data frame was received, and the frame information further comprises an Internet Protocol multicast-group address of the received data frame.

24. A non-transitory computer readable medium encoded with a computer program for managing data traffic related to data driven-learning and occurring between a network element of a software-defined network and a controller of the software-defined network, the network element maintaining, in accordance with configuration data received from the controller, a control system for managing data received at the network element, the computer program comprising computer executable instructions for controlling a programmable processing system of the network element to:

check, in response to a situation in which the control system has no entry corresponding to frame information related to a data frame received at the network element, whether status information contains an indication that the frame information is available to the controller, and in response to a situation in which the status information lacks the indication, update the status information to contain the indication and arrange the frame information to be available to the controller so as to enable the controller to produce updated configuration data in accordance with the frame information, the status information being updated without waiting for the updated configuration data from the controller, wherein the frame information comprises a source address of the received data frame and an identifier of an ingress interface at which the data frame was received at the network element.

\* \* \* \* \*